Figure 1:
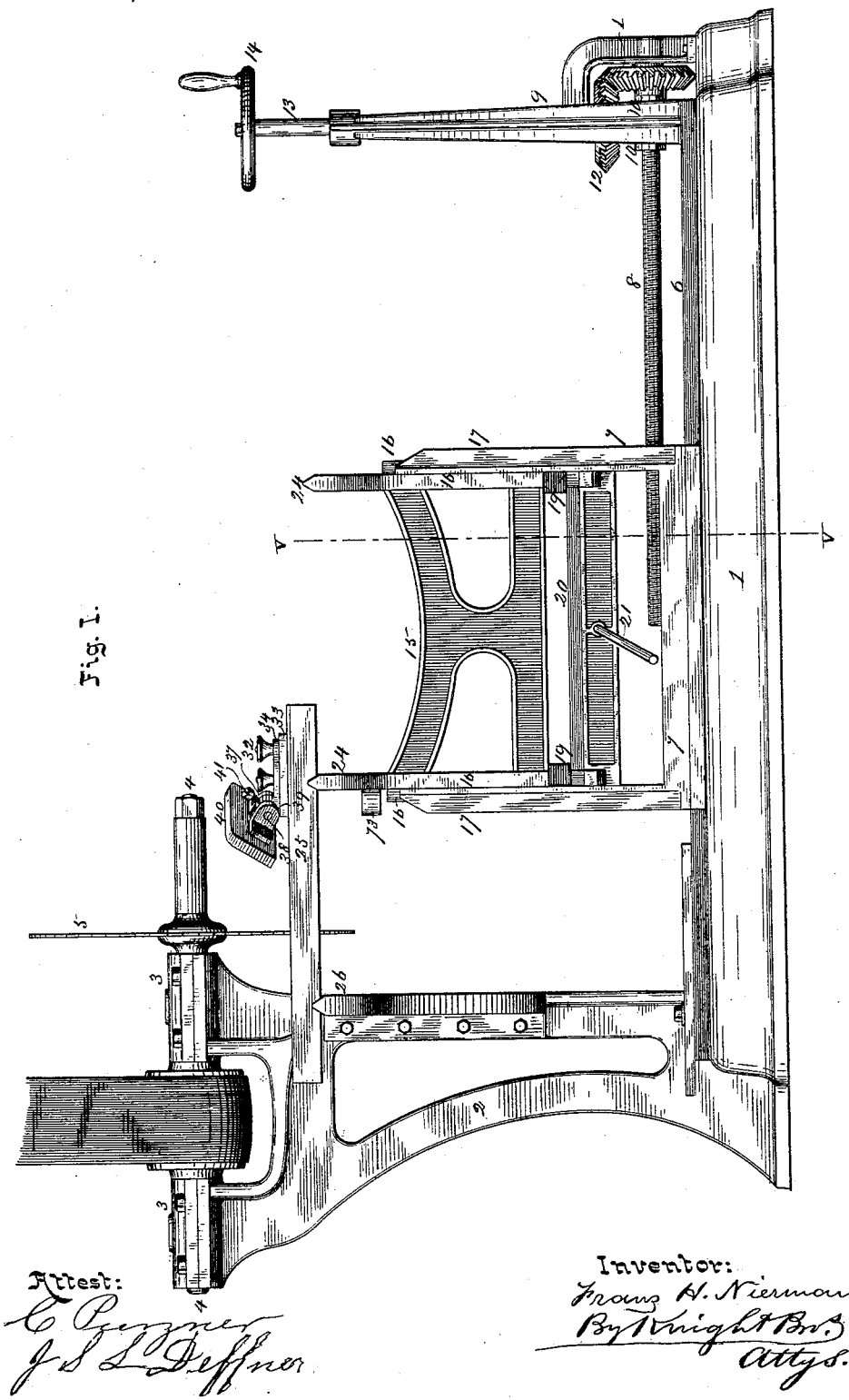

(No Model.) 6 Sheets—Sheet 1.
F. H. NIERMANN.
WOOD TURNING AND WORKING MACHINE.

No. 487,637. Patented Dec. 6, 1892.

Attest:
C. Pezzner
J. S. L. Deffner

Inventor:
Franz H. Niermann.
By Knight Bro.
Attys.

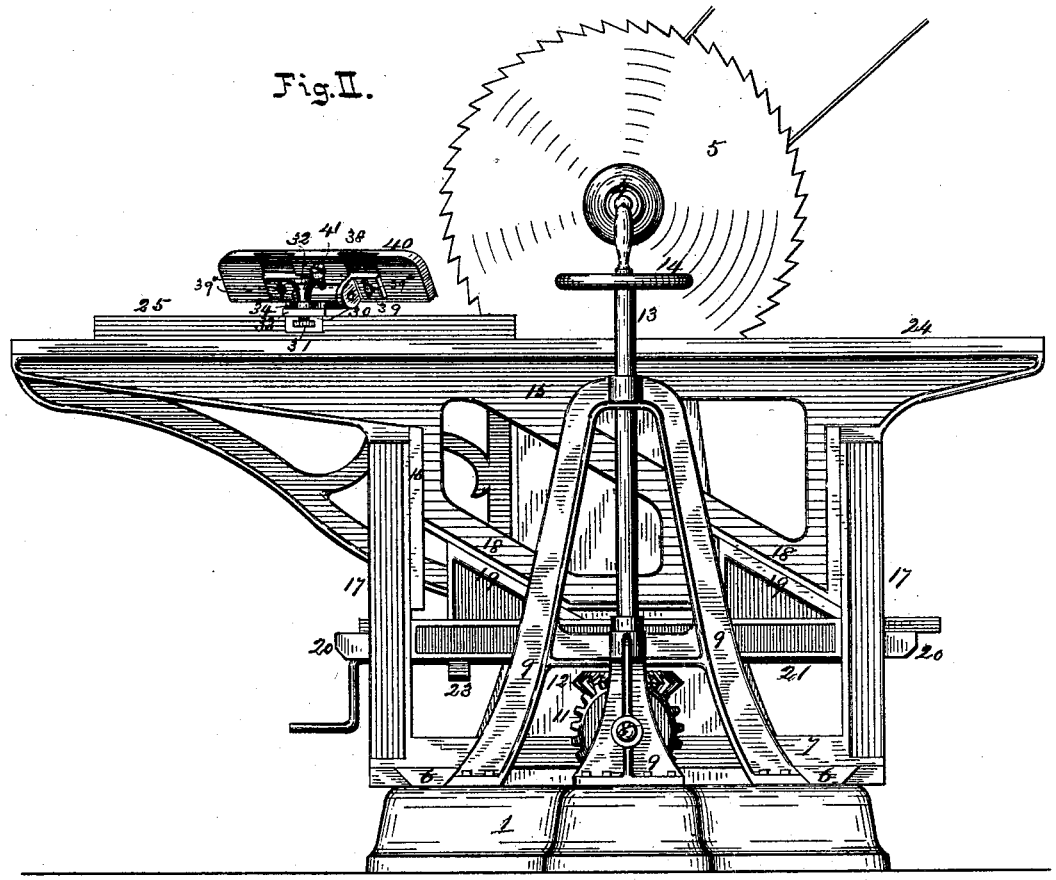

(No Model.) 6 Sheets—Sheet 3.
F. H. NIERMANN.
WOOD TURNING AND WORKING MACHINE.
No. 487,637. Patented Dec. 6, 1892.
Fig. V.
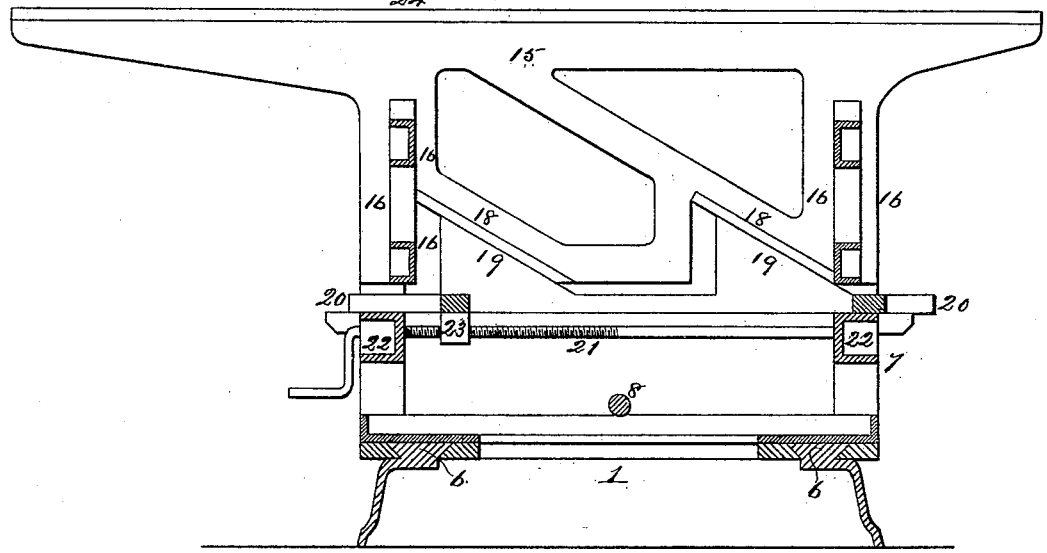
Fig. VI.
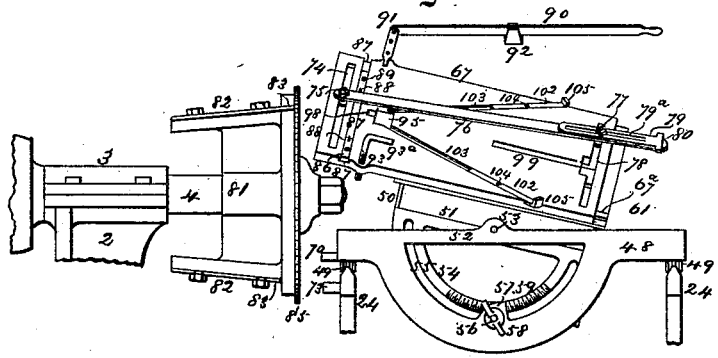
Fig. VII.
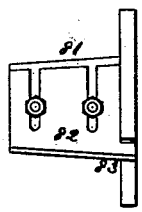
Fig. VIII.
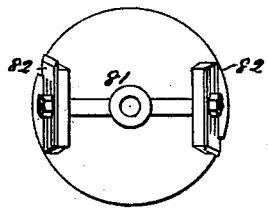
Attest:
C. Purzner
J. L. Jeffers
Inventor:
Franz H. Niermann
By Knight Bros.
Attys.

(No Model.) 6 Sheets—Sheet 4.
F. H. NIERMANN.
WOOD TURNING AND WORKING MACHINE.
No. 487,637. Patented Dec. 6, 1892.
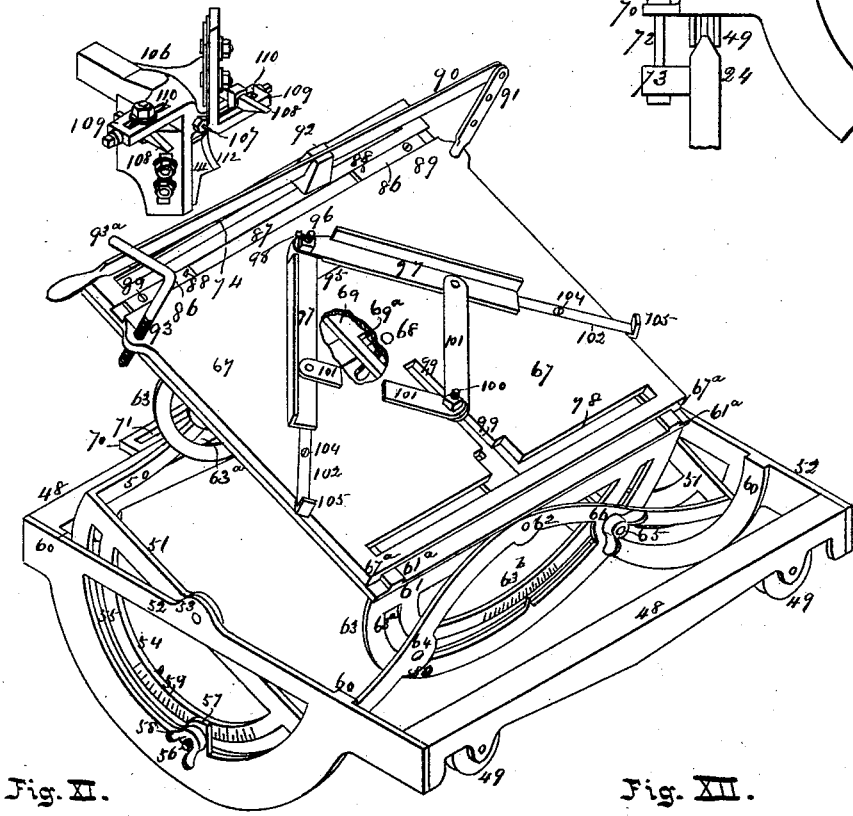
Attest:
C. Punzner
J. L. Deffner
Inventor:
Franz H. Niermann
By Knight & Bro.
Attys.

(No Model.)  6 Sheets—Sheet 5.
F. H. NIERMANN.
WOOD TURNING AND WORKING MACHINE.
No. 487,637.  Patented Dec. 6, 1892.
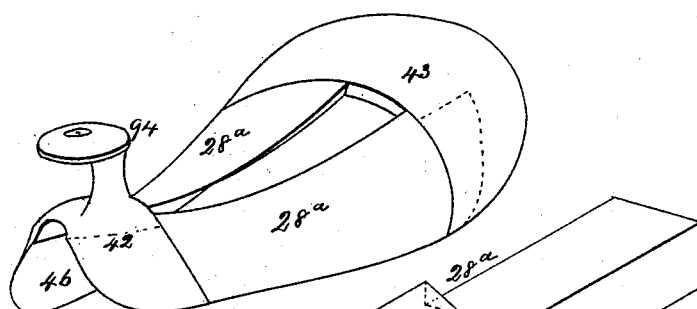
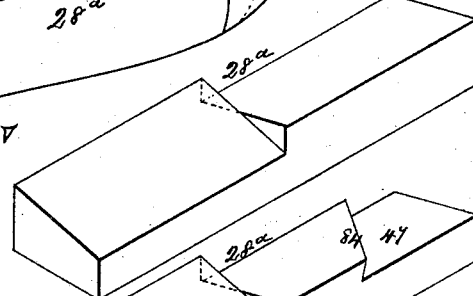
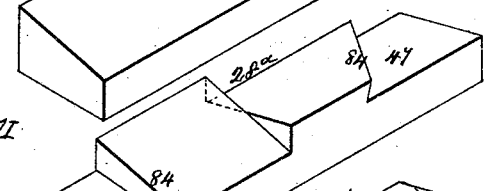
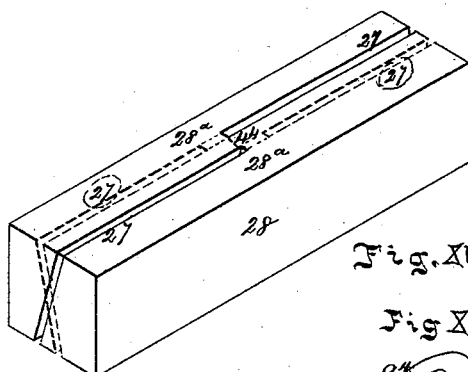
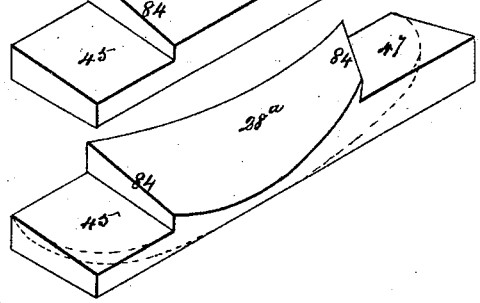

(No Model.) 6 Sheets—Sheet 6.
F. H. NIERMANN.
WOOD TURNING AND WORKING MACHINE.
No. 487,637. Patented Dec. 6, 1892.
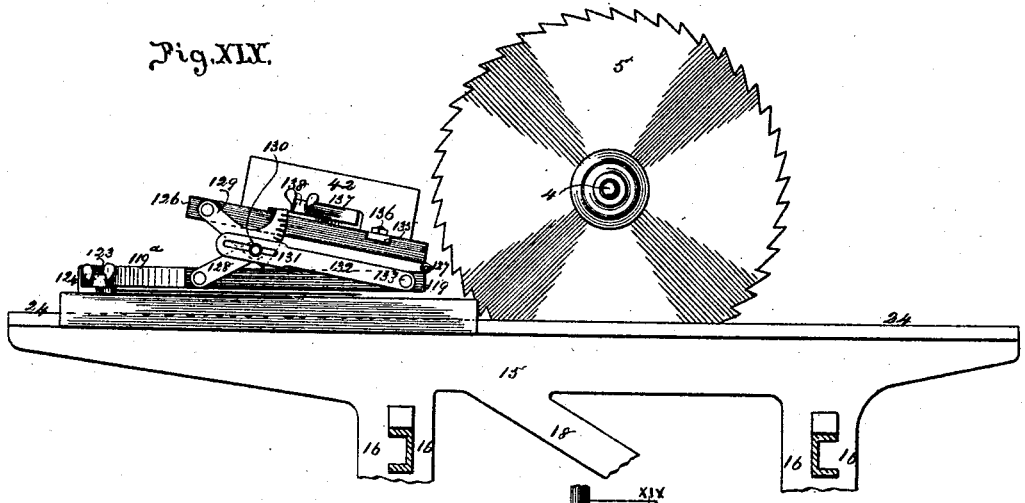
Fig. XIX.
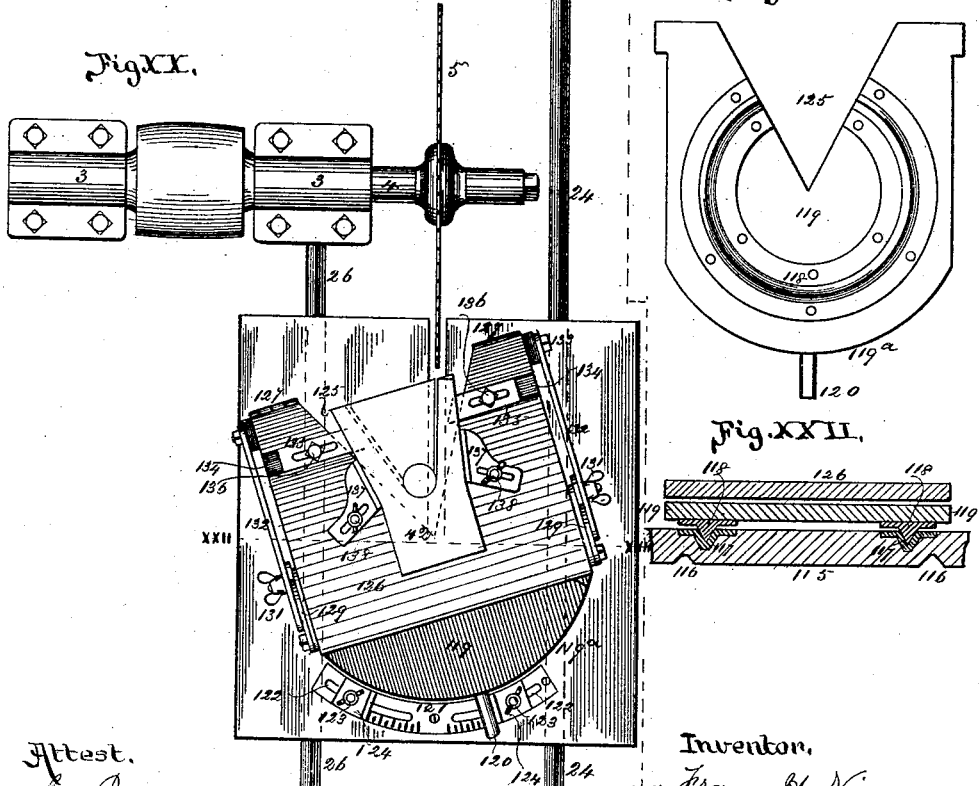
Fig. XX. Fig. XXI. Fig. XXII.
Attest.
C. Purzner
J. S. L. Deffner
Inventor,
Franz H. Niermann.
By Knight Bro.
Attys

UNITED STATES PATENT OFFICE.

FRANZ H. NIERMANN, OF JEFFERSON, MISSOURI.

WOOD TURNING AND WORKING MACHINE.

SPECIFICATION forming part of Letters Patent No. 487,637, dated December 6, 1892.

Application filed February 27, 1891. Serial No. 383,131. (No model.)

*To all whom it may concern:*

Be it known that I, FRANZ H. NIERMANN, of the city of Jefferson, county of Cole, in the State of Missouri, have invented a certain new and useful Improvement in Wood Forming and Working Machines, of which the following is a full, clear, and exact description, reference being had to the accompanying drawings, forming part of this specification.

This machine is especially applicable for use in forming some of the parts going into the construction of saddletrees, enabling their construction with great speed and uniformity.

The features of novelty are set forth in the claims.

Figure I is a front elevation of the part of the machine to which the improvement applies arranged with the sliding table and saw. Fig. II is an end elevation of the same. Fig. III is a top view of the table. Fig. IV is a detail perspective view of part of the table viewed from below, part being broken away to show the clamping-screws of the adjustable stop. Fig. V is a section taken at line V V, Fig. I. Fig. VI is a front elevation of the cutter-head and universally-adjustable carriage arranged for scarfing off the ends of the side blocks. Fig. VII is a top view of the cutter-head. Fig. VIII is an end view of the cutter-head. Fig. IX is a perspective view of the cutter-head and universally-adjustable carriage arranged for shaping the end of the horn. Fig. X is a front elevation showing the universally-adjustable carriage bolted to its ways as used in forming the end of the horn. Fig. XI is a side view of the cutter-head used in shaping the end of the horn. Fig. XII is a view of same, taken at right angles to Fig. XI. Fig. XIII is a perspective view of a saddletree, which is not given as showing any novelty, but as an illustration to render the specification more clear. Fig. XIV is a perspective view of the block from which two of the side pieces 28ª are made, the full lines indicating the position of the kerfs 27 for two left-side pieces, and the broken lines the position of the kerfs for two right-side pieces. Figs. XV, XVI, and XVII are perspective views showing a left-side piece in various stages of manufacture. Fig. XVIII is a perspective view of a horn-piece. Fig. XIX is a detail section at XIX XIX, Fig. XX, showing the table for the making the recess in the horn-piece; and Fig. XX is a top view of the same. Fig. XXI is a bottom view of the turn-table of the horn-piece rest. Fig. XXII is a vertical section taken on the line XXII XXII of Fig. XX.

1 is the base of the machine.

2 is a frame giving bearing at 3 to the shaft or mandrel 4, which carries a saw 5 or a cutter-head, according to the work being performed.

6 are ways or guide-rails on the base 1, upon which works the carriage 7. The carriage is moved in a line parallel with the saw-shaft 4 by a feed-screw 8, working in the carriage and having bearing in the standard 9, in which it is restrained from endwise movement by collars 10.

11 is a miter-wheel keyed to the feed-screw and engaging a similar wheel 12 on the vertical hand-shaft 13. The hand-shaft is turned by a hand-wheel or hand-crank 14.

The carriage 7 has a vertically-adjustable frame 15, with guides 16 bearing against the carriage-uprights 17, the table being restricted by the guides to direct vertical movements. The table has inclines 18 resting on the inclines 19 of a sliding-frame 20 of the carriage, the transverse movement of the frame 20 causing the vertical movement of the table. The frame 20 is moved by a hand-screw 21, having bearing in the bars 22 of the carriage and turning in a fixed nut 23 of the sliding-frame 20. The frame 15 has ways or guide-rails 24 extending transversely of the machine and adapted to support a moving table or carriage 25. At times the table 25 is supported upon one of these ways and a similar way 26 of the frame 2, as seen in Fig. I. This is the arrangement when sawing the inclined kerf 27 in the blocks from which are made the side pieces 28 of the tree. The table has grooves 29 fitting the ways 24 26. (See Fig. IV.)

The table 20 has a T-formed slot 30 running longitudinally across its top, in which fits the square head 31 of a clamping screw or bolt 32, by which a bracket-plate 33 is clamped to the table. (See Figs. III and IV.)

34 is a bracket through which passes a clamping screw or bolt 35, which passes through a curved 36 in the bracket, said slot being concentric with the screw 32, so that the bracket may be turned on this screw as an axis and be clamped fast in any position by the screw 35. (See Figs. I, II, III, and IV.) The bracket has a rib or enlargement 37, through which passes a pintle 38, secured in the dovetailed lugs 39. The lugs are slotted to receive screws $39^a$, that are fixed in the guide-plate 40, adjustable on the lugs.

41 is a set-screw turning in the rib 37 and whose point bears against the pintle 38 to lock the plate 40 in any position. The plate 40 forms a guide against which is placed the inner side of the block 28 when the kerfs 27 are being sawed. Each block when sawed as indicated by full lines in Fig. XIV is adapted to supply two left-side pieces $28^a$ of a saddle-tree, and when sawed as indicated by broken lines two right-side pieces for the same. When the kerfs 27 have been sawed the block is separated in two similar parts $28^a$ by cutting the central connection at each side, as indicated by broken lines at 4 4.

When sawing the kerfs 27 in the rectangular block 28, the guide-plate 40 is fixed at the proper vertical inclination. The block is held with one of the flat sides against the guide-plate 40 and the table 25 pushed forward until the inclined kerf about reaches the middle of the block. The block is then turned end for end and the action repeated, leaving the block in the condition seen in Fig. XIV. $25^a$ is a slot in the table to receive the saw.

Fig. XIV shows the block 28 after the kerfs 27 have been sawed in it.

Fig. XV shows one of the pieces $28^a$.

Fig. XVI shows the piece $28^a$ after the recesses 45 and 47 have been made.

Fig. XVII shows the piece $28^a$ when it has been further shaped, and in this figure broken lines indicate still further shaping.

Each part $28^a$ of the block 28 requires to have a recess 45 made at one end to fit the part 46 of the horn-piece and a recess 47 at the other end to fit the under side of the cantle 43. The machinery for forming these recesses will now be described.

48 is a carriage having at the four corners grooved wheels 49, adapted to run on the V-formed ways 24 of the frame 15.

50 is a frame whose end bars 51 are pivoted at the middle to the end bar 52 of the carriage, one of the pivots being shown at 53, Fig. IX. The frame 50 has at each end guide-bars 54, concentric with the pivots 53 and having concentric slots 55, through one or both of which passes a set-screw 56, passing also through a lug 57 of the carriage 48, and fitted with a thumb-nut 58, by which the frame is secured at any inclination. The curved guide-bar has a scale 59, by which the inclination of the frame 50 is indicated. The peripheries of the curved guide-bars 54 work against concentric guide-ribs 60 of the carriage 48.

61 is a tilting frame pivoted at 62 to the side bars of the frame 50, the pivots 53 and 62 giving the frame universal adjustment as to inclination.

63 are semicircular guide-bars concentric with the pivot 62 and having concentric slots $63^a$, through which pass guide-pins 64, and a clamping-bolt 65, with a thumb-nut 66. By means of the bolt and nut the frame 61 may be locked in any position upon the frame 50. The guide-bar 63 has a scale $63^b$ to indicate the inclination of the frame 61.

67 is a table connected by means of a central screw-bolt 68 with a cross-bar of the frame 61. The cross-bar 69 has a longitudinal slot $69^a$, through which the bolt passes, the construction being such that the table may be moved longitudinally, the table being guided by guide-ribs $61^a$ and $67^a$, (see Fig. IX,) the table being clamped in any position by the bolt 68. In order to lock the carriage 48 upon the ways 24, the carriage has a projection 70, with a slot 71 for the passage of a clamping-bolt 72, that passes through a similar slot in a projection 73 upon one of the ways 24. (See Figs. I, VI, IX, and X.) The table has a transverse slot 74 near its forward edge that is presented toward the cutter-head, and through this passes a bolt 75, that also passes through the end of a guide-bar 76. 77 is a bolt whose head works in a transverse slot 78 of the table and through a longitudinal slot in the bar 76, also through a slot $79^a$ in a bar 79, said bar having a T-head 80. It will be seen that the bars 76 and 79 may be secured in any required position upon the table and the T-head 80 placed the required distance from the cutter-head. This guide is used to fix the position of the side bar $28^a$ (shown in Fig. XV) when cutting the recesses 45 and 47. The cutter-head used in cutting these recesses is shown in Figs. VI, VII, and VIII. This cutter-head 81 upon the mandrel 4 has cutters 82 inclined from the line of the shaft 4, the outer ends 83 being more distant from the shaft than the inner ends, so that the surface of the recess 45 or 47 forms an acute angle with the shoulder 84, which is made by the circular saw 85, that is of course at right angles to the shaft. The table has bars 86 sliding in dovetail or I-slots 87 and carrying steady-points 88, whose office is to pierce the objects being operated on and hold them in position. The bars 86 have set-screws 89 bearing against the bottoms of the slots 87 and holding the bars in position. To hold the object down upon the table, there is a hand-lever 90, having at the end a pivotal fulcrum 91 and having an adjustable bearing-block 92 adapted to rest on the work. The free end of the lever may be held down by the side bar 93ª of a screw turn-button 93. (See Figs. VI and IX.)

The devices for rounding the end of the horn 94 will now be described. The table 67 has an aperture 95 to allow the passage of the head of a bolt 96, said bolt forming the pivot of the two guide-bars 97, made of angle-iron. From the aperture 95 extends a slot 98 to receive the shank of the bolt 96, so that when the bolt is in the slot and the nut screwed down these ends of the bars 97 are held fixed in position.

99 is a longitudinal slot in the table 67, adapted to receive the shank of a bolt 100, that passes through the ends of two toggle-links 101, whose other ends are hinged to the bars 97. By these links the guide-bars 97 are held apart at their free ends, the distance of the bolt 100 from the bolt 96 thus governing the position of the guide-bars.

102 are sliding guides adjustable in oblique slots 103 of the table and held fast by set-screws 104. These guides are turned upward at the ends 105, so as to form back-rests for any object laid upon the table, especially the ends of the horn-piece 42. When rounding off the end of the horn, the horn-piece is laid on the table with the faces 46 against the upright flanges of the angle-bars 97, which are spread to have the same angle as that formed by the parts 46 of the horn-piece. The block 92 of the lever 90 is now pressed down upon the horn-piece and the carriage 7 moved toward the cutter-head by the feed-screw 8, the horn being cut into a circular form and convexed at the ends by a suitable cutter-head upon the mandrel 4. The cutter-head 106 has a central point 107 entering the horn.

108 are two chisel-edged cutters that give the horn its round form and which are set in bracket-arms 109, the brackets being slotted at 110 to allow the cutters to be placed at a greater or less distance from the center.

111 are cutters having concaved edges 112, adapted to convex the end of the horn. These cutters are secured to the head by bolts 113, passing through slots in the bracket-arms 114, so as to be adjustable, as may be required. (See Figs. IX, XI, and XII.)

The devices for recessing the horn-piece will now be described. (See Figs. XIX to XXII.) 115 is a table having grooves 116 fitting the guide 26 and one of the guides 24. The table has a slot 115ª to admit the saw. The table has in the top surface a groove 117 in the arc of a circle, in which fits a rib 118 of the turn-table 119. The construction is such that the turn-table may be turned to any required angle to give the horn-piece proper presentation to the saw 5 to cut out the recess, leaving the faces 46 at the required inclination for the attachment of the front end 45 of the side pieces. The rear end 119ª of the turn-table is made concentric with the rib 118. This end has a stud 120, that moves over a graduated arc 121 upon the table 115.

The graduated arc is upon a plate slotted at 122 in the direction of its length, and in these slots are set-screws 123, that pass through stops 124, with which the stud 120 comes in contact to limit the movement of the turn-table. (See Fig. XX.) The turn-table has an angular part cut out, leaving a recess 125 at the front side to allow the entrance of the saw as the table is pushed forward on the ways 24 26.

126 is a rest hinged to the front side of the turn-table at 127 and supported at the rear side by toggle-links 128 129 upon each side, the former being hinged to the turn-table and the latter hinged to the rest. These links are hinged together at 130, and the pivot-bolt passes through the slot 131 of an arm 132, hinged to the turn-table at 133. The bolts 130 act as set-screws and hold the links to any proper adjustment, and as a result hold the rest at any proper inclination. The rest has transverse slots 134, in which slide bars 135, that are used to support the horn-piece, as seen in Fig. XX. These bars are adjustable and are held in the desired position by set-screws 136, fixed in the rest and passing through longitudinal slots in the bars.

137 are side rests fixed to the rest by set-screws 138, that are fixed in the rest and pass through slots in the side rests. The sides of the horn-piece are laid against the side rests, as seen in Fig. XX. The rest 126 has a recess similar to the recess 125 of the turn-table and for a similar purpose.

I claim as new and of my invention—

1. The combination of the carriage 7, having longitudinal movement, the frame 15, having vertical adjustment on the carriage, and a table 67, having transverse and universal tilting movement on the frame 15, substantially as and for the purpose set forth.

2. The combination of the base 1, having ways 6, the carriage 7, working on said ways and having the vertical guides 17, the vertically-adjustable frame 15, having the vertical guides 16 and the inclines 18, the sliding frame 20, having the inclines 19, and means for moving said sliding frame, substantially as set forth.

3. The combination of the work-supporting table 67, having slots 98 and 99, the guides 97, pivoted to the common bolt 96 in the slot 98, and the links 101, connecting said guides 97 and pivoted to the common bolt 100 in the slot 99, substantially as and for the purposes set forth.

4. The combination, with the table 67, having universal tilting movement, and the lever 90, fulcrumed on a turning-support 91 and having a bearing-block 92, substantially as set forth.

5. In a wood-working machine, the combination of a suitable bed-frame, the ways 26 thereon, a longitudinally-movable carriage 7, a vertically-adjustable frame 15 on the carriage and having ways 24, a table or carriage adapted to work on ways 24 and 26, and an adjustable rest on the table, substantially as and for the purpose set forth.

6. In a wood-working machine, the combination of a suitable bed-frame having suitable ways, a carriage 7, working on said ways, a vertically-adjustable frame 15 on the carriage and having ways 24, a frame 48, working on the ways 24 and carrying the universally-adjustable frame 61, the table 67, supported thereon, and means for holding the object in position upon said table, substantially as and for the purpose set forth.

FRANZ H. NIERMANN.

In presence of—
C. PURZNER,
J. S. L. DEFFNER.